United States Patent
Madhaven

(10) Patent No.: US 10,780,736 B2
(45) Date of Patent: Sep. 22, 2020

(54) DROPOUT ASSEMBLY

(71) Applicant: Trek Bicycle Corporation, Waterloo, WI (US)

(72) Inventor: Sridharan Madhaven, Waterloo, WI (US)

(73) Assignee: Trek Bicycle Corporation, Waterloo, WI (US)

(*) Notice: Subject to any disclaimer, the term of this patent is extended or adjusted under 35 U.S.C. 154(b) by 432 days.

(21) Appl. No.: 15/816,857

(22) Filed: Nov. 17, 2017

(65) Prior Publication Data

US 2019/0152258 A1   May 23, 2019

(51) Int. Cl.
*B62K 25/02* (2006.01)
*B60B 27/02* (2006.01)
*B60B 35/00* (2006.01)
*B62K 25/10* (2006.01)
*B62K 25/08* (2006.01)
*B60B 35/02* (2006.01)
*B60B 35/04* (2006.01)

(52) U.S. Cl.
CPC .......... *B60B 27/026* (2013.01); *B60B 35/004* (2013.01); *B62K 25/02* (2013.01); *B62K 25/08* (2013.01); *B62K 25/10* (2013.01); *B60B 35/025* (2013.01); *B60B 35/04* (2013.01); *B60B 2900/541* (2013.01); *B60Y 2200/13* (2013.01); *B62K 2206/00* (2013.01)

(58) Field of Classification Search
CPC ..... B60B 27/026; B60B 35/004; B62K 25/02; B62K 25/04; B62K 25/08; B62K 25/10
See application file for complete search history.

(56) References Cited

U.S. PATENT DOCUMENTS

| 4,598,614 | A | | 7/1986 | Kipp | |
|---|---|---|---|---|---|
| 5,673,925 | A | * | 10/1997 | Stewart | B62K 25/02 280/279 |
| 8,042,881 | B2 | * | 10/2011 | Inoue | B62K 23/06 280/279 |
| 8,186,768 | B2 | | 5/2012 | Spahr | |
| 8,783,790 | B2 | | 7/2014 | Achenbach | |
| 9,616,963 | B2 | | 4/2017 | Walthert et al. | |
| 2008/0197600 | A1 | * | 8/2008 | Watarai | B62K 25/02 280/279 |
| 2016/0031521 | A1 | * | 2/2016 | Voss | B62K 25/02 301/124.2 |

FOREIGN PATENT DOCUMENTS

DE   202016100934 U1   5/2017
EP   1801005   6/2007

* cited by examiner

*Primary Examiner* — Scott A Browne
(74) *Attorney, Agent, or Firm* — Bell & Manning, LLC; Christopher Kalafut

(57) ABSTRACT

A dropout assembly comprises a first dropout that includes a first through hole configured to receive an axle for a bicycle wheel. The dropout assembly also comprises a second dropout that includes a second through hole and a mounting surface. The second through hole is configured to receive the axle for the bicycle wheel. The dropout assembly also includes a rotational control mechanism that is configured to mount to the mounting surface of the second dropout. The rotational control mechanism includes a nut and a nut cover.

12 Claims, 6 Drawing Sheets

DROPOUT ASSEMBLY

BACKGROUND

A bicycle fork refers to a component that holds the front bicycle wheel in place. A traditional bicycle fork includes a pair of blades that run parallel to one another. At a bottom of the bicycle fork, the pair of blades is parallel to one another and forms an opening to receive the wheel. Specifically, the bottom of each blade includes a dropout, and the dropouts are configured to secure the axle of the bicycle wheel. At a top of the bicycle fork, the blades are joined together by a component of the fork referred to as a fork crown. The fork crown attaches to a steering tube, which in turn is attached to the bicycle handlebars so that a rider can steer the front wheel of the bicycle.

SUMMARY

An illustrative dropout assembly comprises a first dropout that includes a first through hole configured to receive an axle for a bicycle wheel. The dropout assembly also comprises a second dropout that includes a second through hole and a mounting surface. The second through hole is configured to receive the axle for the bicycle wheel. The dropout assembly also includes a rotational control mechanism that is configured to mount to the mounting surface of the second dropout. The rotational control mechanism includes a nut and a nut cover.

Other principal features and advantages of the invention will become apparent to those skilled in the art upon review of the following drawings, the detailed description, and the appended claims.

BRIEF DESCRIPTION OF THE DRAWINGS

Illustrative embodiments will hereafter be described with reference to the accompanying drawings, wherein like numerals denote like elements. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Dropouts refer to components mounted to a bicycle frame that are used to secure the front and/or rear wheel of the bicycle. Dropouts that are used to secure a front bicycle wheel are typically mounted to the bottom of the blades of the front bicycle fork. Some traditional dropouts (i.e., open dropouts) utilize an open configuration in which a u-shaped opening of the dropout slides over an axle of the bicycle wheel. The axle is then secured to the u-shaped opening of the dropout using nuts or a quick release mechanism. The u-shaped openings can be oriented horizontally toward the front of the bicycle, horizontally toward the rear of the bicycle, vertically (downward), or at an offset angle depending on the bicycle type, wheel type, wheel placement, etc.

Other traditional dropouts (i.e., closed dropouts) utilize enclosed apertures (or through holes) to receive a wheel axle instead of a u-shaped opening. In such a configuration, a threaded wheel axle can be placed through the apertures on each of the 2 dropouts, and each end of the wheel axle is secured to the dropout with a nut or other fastener. In other configurations, a quick release axle having a quick release handle on one end and a threaded rod on the other end may be used. The quick release handle enables a user to thread or unthread by hand the threaded portion of the wheel axle into at least one of the dropout apertures without the use of additional tools. As known to those of skill in the art, when such a quick release axle is mounted to the bicycle, it is desirable that the quick release handle be oriented in certain directions. For example, when a quick release is used with a fork, it may be desirable to locate the quick release handle upward or toward the rear of the bicycle, as opposed to downward or toward the front of the bicycle. A challenge that can occur with the use of quick release axles is that the quick release handle can end up in various orientations after being properly tightened based on the particular circumstances of the particular usage case.

Figure 1A:
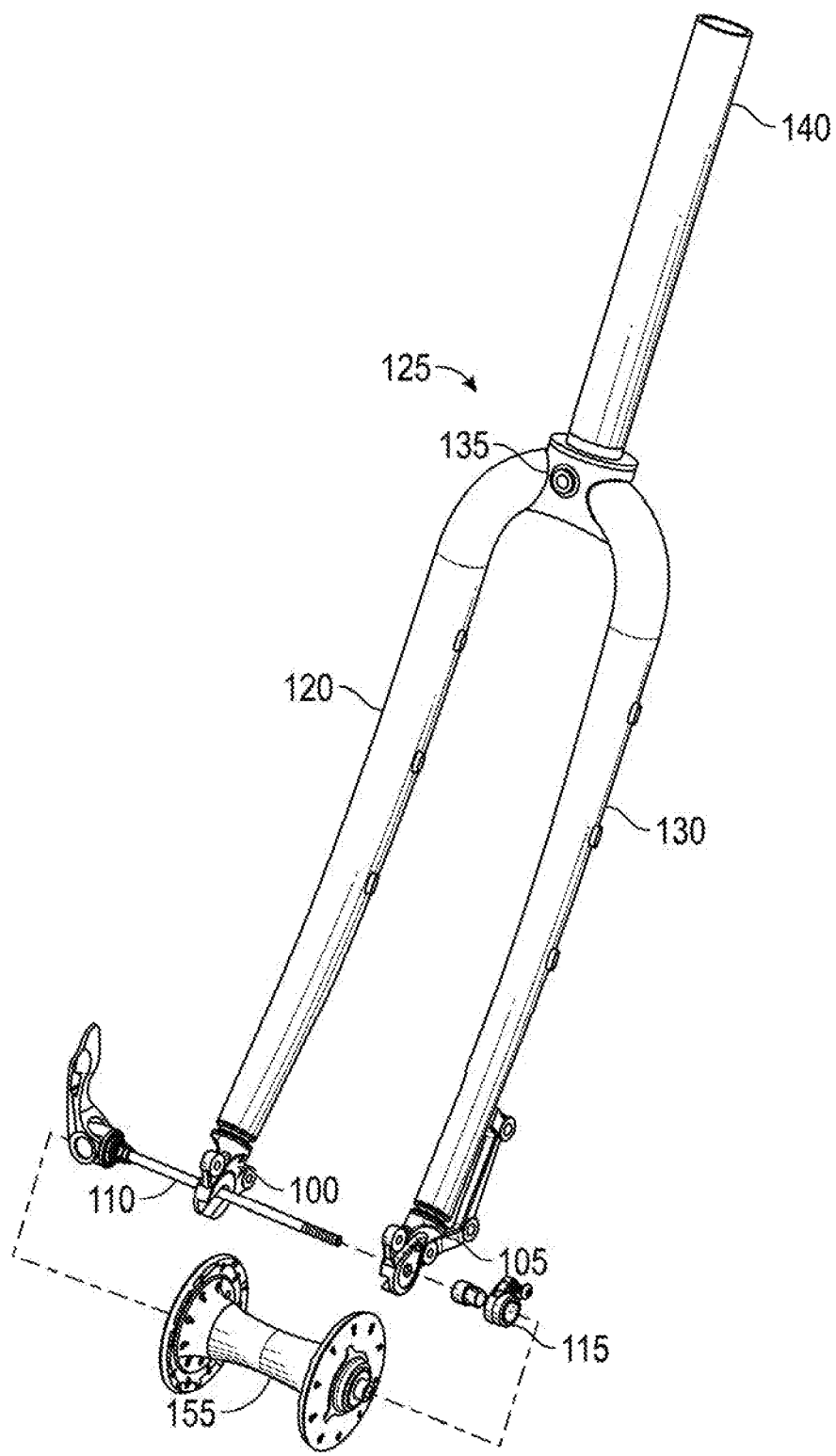
FIG. 1A is an exploded view of a through hole dropout system in accordance with an illustrative embodiment.
Figure 1B:
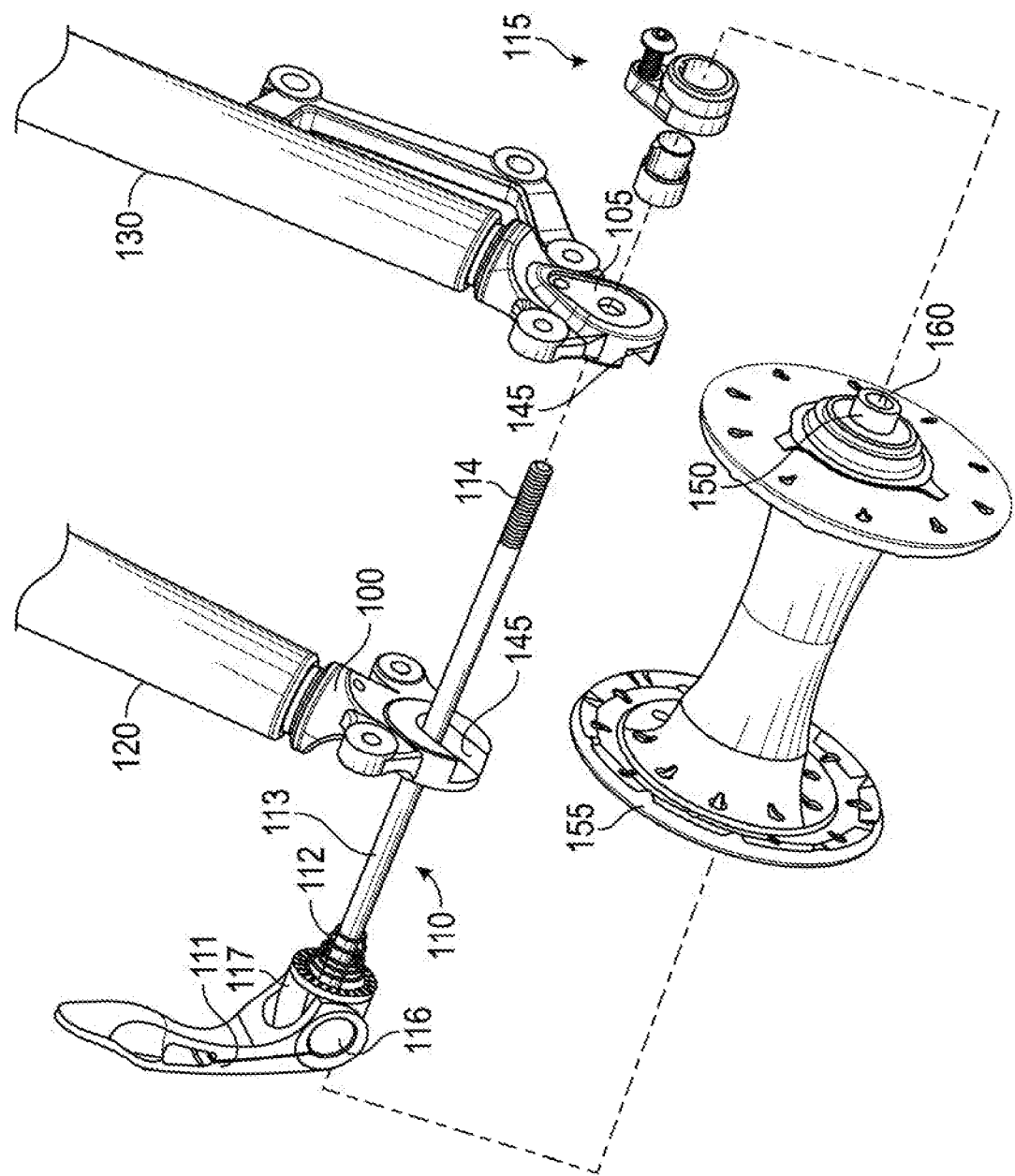
FIG. 1B is a partial exploded view of the through dropout system of FIG. 1A in accordance with an illustrative embodiment.

Described herein is a through hole dropout system that enables proper orientation of a quick release handle regardless of the handle orientation upon tightening of the quick release axle. FIG. 1A is an exploded view of a through hole dropout system in accordance with an illustrative embodiment. FIG. 1B is a partial exploded view of the through dropout system of FIG. 1A in accordance with an illustrative embodiment. The through hole dropout system (or system) is used to secure a rim 155 of a bicycle wheel to a bicycle fork 125. As depicted, the bicycle fork 125 includes a first blade 120, a second blade 130, and a crown 135 at which the first blade 120 and the second blade 130 are joined together. The crown 135 of the bicycle fork 125 is mounted to a steering tube 140 of the bicycle.

In an illustrative embodiment, the through hole dropout system includes a first dropout 100, a second dropout 105, a quick release mechanism 110, and a rotational control mechanism 115. In alternative embodiments, the through hole dropout system may include additional, fewer, and/or different components. The quick release mechanism 110 includes a quick release handle 111, a spring 112 that is used to help secure the quick release handle 111, and an axle 113 (or shaft) that includes a threaded end 114. The quick release handle 111 is able to pivot about a pivot pin 116 such that the quick release handle 111 can be cantilevered relative to the axle 113. Specifically, the quick release handle 111 can be positioned in an unlocked position in which the quick release handle 111 can be used to turn the axle 113 and a locked position in which the quick release handle 111 does not rotate. The quick release handle 111 is in the locked position in FIGS. 1A and 1B. The pivot pin 116 is mounted to a cap 117 which is secured to the axle 113 via a fastener (not shown). The fastener can be a bolt, screw, or any other type of fastener. In an illustrative embodiment, the spring 112 is used to apply pressure to the cap 117 such that the fastener which secures the cap 117 is less likely to back out. The threaded end 114 of the axle 113 is configured to thread into the rotational control mechanism 115, as described in more detail with reference to FIG. 4.

The first dropout 100 is mounted to the first blade 120 of the bicycle fork 125, and the second dropout 105 is mounted to the second blade 130 of the bicycle fork 125. In an illustrative embodiment, the first dropout 100 and the second dropout 105 can be made of aluminum, carbon, or any other suitable material. As depicted in FIG. 1B, each of the first dropout 100 and the second dropout 105 includes an indented slot 145 that is configured to receive a hub 150 that is mounted on each end of the rim 155 for the bicycle wheel. It is noted that only one of the hubs 150 is depicted in the view of FIGS. 1A and 1B. The rim 155 of the bicycle wheel also includes an opening 160 that extends between the hubs 150 on each end of the rim 155. The opening 160 is configured to receive the axle 113 of the quick release mechanism 110, as discussed in more detail below.

Figure 2A:
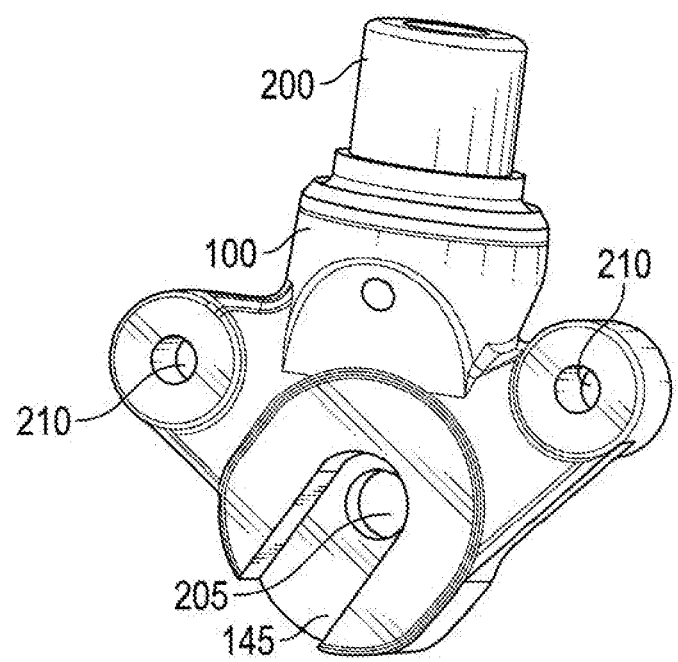
FIG. 2A is a perspective view of an inner side of a first dropout in accordance with an illustrative embodiment.
Figure 2B:
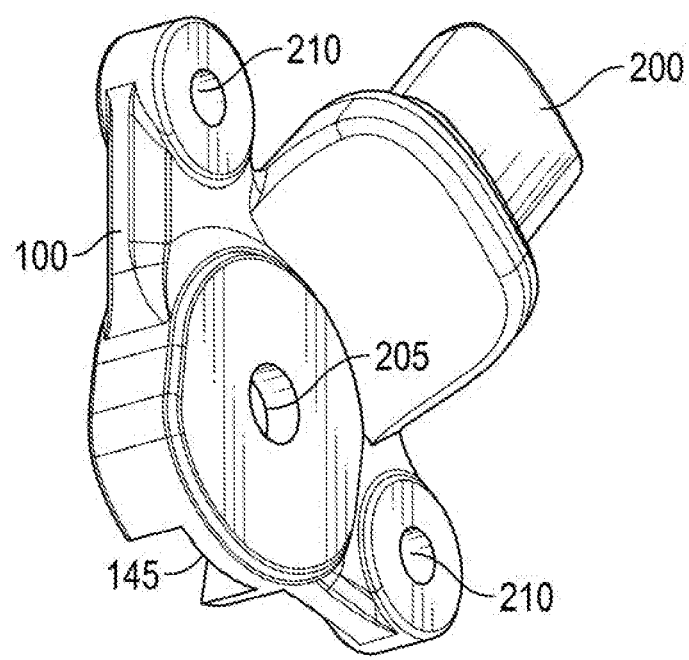
FIG. 2B is a perspective view of an outer side of the first dropout in accordance with an illustrative embodiment.

FIG. 2A is a perspective view of an inner side of the first dropout 100 in accordance with an illustrative embodiment. FIG. 2B is a perspective view of an outer side of the first dropout 100 in accordance with an illustrative embodiment. As used with respect to the first dropout 100, inner refers to the side which faces toward the bicycle wheel and outer refers to the side which faces away from the bicycle wheel. The first dropout 100 includes a mounting stem 200 that is used to mount the first dropout 100 to the first blade 120 of the bicycle fork 125 depicted in FIGS. 1A and 1B. In an illustrative embodiment, the mounting stem 200 is received by an opening at the end of the first blade 120. The mounting stem 200 can be secured to the first blade 120 of the bicycle fork 125 through a friction fit, adhesive, fasteners, and/or any other method known to those of skill in the art. The first dropout 100 also includes a through hole 205 that is configured to receive the axle 113 depicted in FIGS. 1A and 1B. Accessory holes 210 on the first dropout 100 can be used to mount a bicycle rack, fender, or other component to the bicycle. As depicted in FIGS. 1 and 2, the indented slot 145 of the first dropout 100 is oriented at a downward angle toward a front of the bicycle when the first dropout 100 is mounted. In alternative embodiments, the indented slot 145 may be at a different orientation.

Figure 3A:
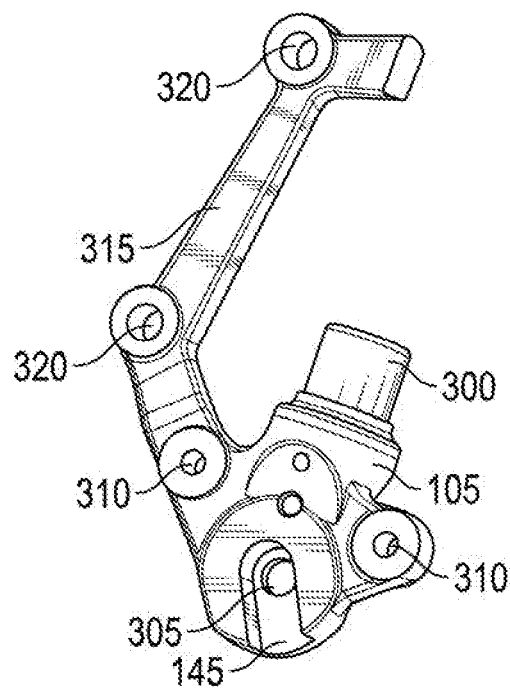
FIG. 3A is a perspective view of an inner side of a second dropout in accordance with an illustrative embodiment.
Figure 3B:
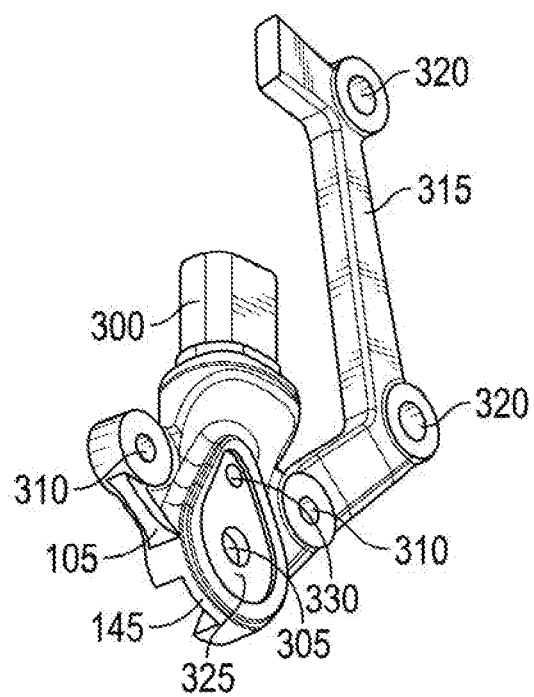
FIG. 3B is a perspective view of an outer side of the second dropout in accordance with an illustrative embodiment.

FIG. 3A is a perspective view of an inner side of the second dropout 105 in accordance with an illustrative embodiment. FIG. 3B is a perspective view of an outer side of the second dropout 105 in accordance with an illustrative embodiment. Similar to the first dropout 100, inner refers to the side of the second dropout 105 which faces toward the bicycle wheel and outer refers to the side of the second dropout 105 which faces away from the bicycle wheel. The second dropout 105 includes a mounting stem 300 that is used to mount the second dropout 105 to the second blade 130 of the bicycle fork 125 depicted in FIGS. 1A and 1B. In an illustrative embodiment, the mounting stem 300 is received by an opening at the end of the second blade 130. The mounting stem 300 can be secured to the second blade 130 of the bicycle fork 125 through a friction fit, adhesive, fasteners, and/or any other method known to those of skill in the art. The second dropout 100 also includes a through hole 305 that is configured to receive the axle 113 of the quick release mechanism 110. In an illustrative embodiment, when mounted, the through hole 305 of the second dropout 105 is aligned with the through hole 205 of the first dropout 100. In another illustrative embodiment, when the hubs 150 of the rim 155 are fully inserted into the indented slots 145 of the first dropout 100 and the second dropout 105, the opening 160 in the rim 155 is aligned with the through hole 205 in the first dropout 100 and the through hole 305 in the second dropout 105. This simplifies installation by allowing a user to insert the axle 113 of the quick release mechanism 110 without having to align the opening 160 in the rim 155 with the through holes in the dropouts.

Similar to the first dropout 100, the second dropout 105 also includes accessory holes 310 that can be used to mount a bicycle rack, fender, or other component to the bicycle. Additionally, the second dropout 105 includes a mounting bracket 315 with mounting bracket holes 320. In an illustrative embodiment, the mounting bracket 315 can be used to mount at least a portion of a braking system to the bicycle. Alternatively, the mounting bracket 315 can be used to mount any other accessories or components. In an alternative embodiment, the mounting bracket 315 may be removed from the second dropout 105. In another alternative embodiment, a mounting bracket may also be included on the first dropout 100 described above. The indented slot 145 of the second dropout 105 is oriented the same as the indented slot 145 of the first dropout 100, which is at a downward angle toward a front of the bicycle when the second dropout 105 is mounted. In alternative embodiments, the indented slot 145 may be at a different orientation. As depicted in FIG. 3B, the second dropout 105 also includes a mounting surface 325 that includes a mounting hole 330. In an illustrative embodiment, the mounting surface 325 and its mounting hole 330 are used to mount the rotational control mechanism 115 depicted in FIG. 1.

Figure 4:
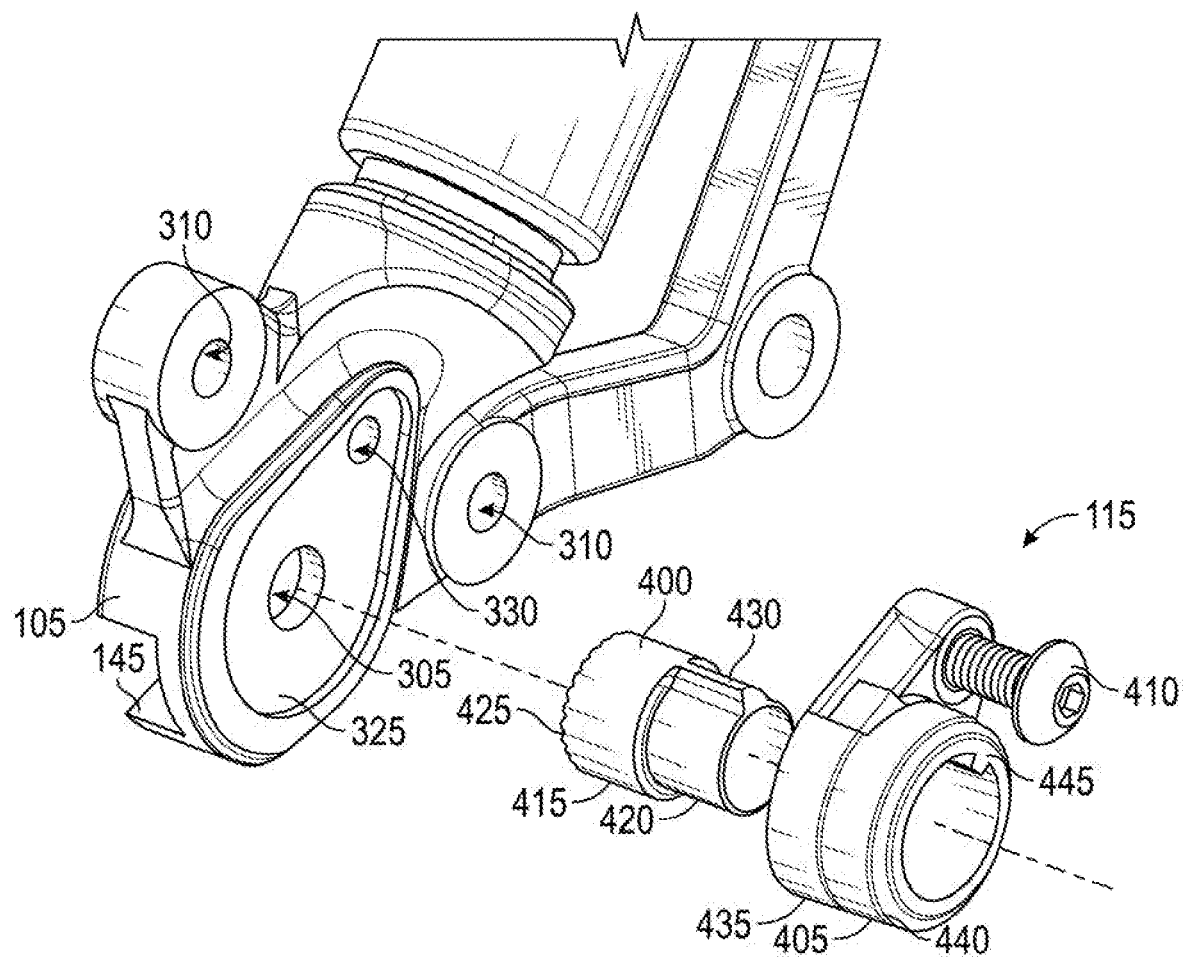
FIG. 4 is a close up exploded view of the second dropout and a rotational control mechanism in accordance with an illustrative embodiment.

FIG. 4 is a close up exploded view of the second dropout 105 and the rotational control mechanism 115 in accordance with an illustrative embodiment. The rotational control mechanism 115 includes a nut 400, a nut cover 405, and a fastener 410. The nut 400 has a first portion 415 and a second portion 420. In one embodiment, the first portion 415 and the second portion 420 of the nut 400 can be made of aluminum, carbon, nylon, or any other suitable material. In another embodiment, the first portion 415 and the second portion 420 of the nut 400 can be made from different materials. The first portion 415 of the nut 400 has a larger diameter than the second portion 420. An interior of the first portion 415 of the nut 400 is threaded, and is configured to receive the axle 113 of the quick release mechanism shown in FIGS. 1A and 1B. In an illustrative embodiment, an interior of the second portion 420 of the nut 400 is not threaded. However, in an alternative embodiment, both the first portion 415 and the second portion 420 of the nut 400 may be threaded. In another alternative embodiment, only the second portion 420 of the nut 400 may be threaded.

As depicted in FIG. 4, the first portion 415 of the nut 400 has a serrated edge 425 that is configured to rest upon the mounting surface 325 of the second dropout 105. The serrated edge 425 is used to help prevent the nut 400 from unintentional rotation when the nut 400 is mounted to the axle 113 and the quick release handle 111 is placed in the locked position. Specifically, when the quick release handle 111 is placed in the locked position, the nut 400 is drawn towards the mounting surface 325 and the teeth which form the serrated edge 425 are designed to grip the mounting surface 325 and prevent rotation of the nut 400. The second portion 420 of the nut 400 includes a nut stop 430, which is a protrusion that runs longitudinally along a length of the second portion 420.

The nut cover 405 is designed slide over and cover the nut 400 when mounted. The nut cover 405 includes a first portion 435 and a second portion 440. In one embodiment, the first portion 435 and the second portion 440 of the nut cover 405 can be made of aluminum, carbon, nylon, or any other suitable material. In another embodiment, the first portion 435 and the second portion 440 of the nut cover 405 can be made from different materials. The first portion 435 of the nut cover 405 has a smooth cylindrical interior that is sized to receive the first portion 415 of the nut 400. The first portion 435 of the nut cover 405 also includes an extension with a hole that is configured to receive the fastener 410 such that the rotational control mechanism 115 can be mounted to the second dropout 105. The second portion 440 of the nut cover 405 has a cylindrical interior that includes a cover stop 445. The cover stop 445 is a protrusion that that runs longitudinally along a length of the interior of the second portion 440 of the nut cover 405. In an illustrative embodiment, the cover stop 445 does not extend into the first portion 435 of the nut cover 405.

The fastener 410, which can be a bolt, screw, or any other type of threaded fastener, is configured to thread into the mounting hole 330 on the mounting surface 325 of the second dropout 105. As depicted in FIG. 4, the mounting surface 325 is in the form of an indentation in the outer surface of the second dropout 105. This indentation that forms the mounting surface 325 is sized to receive the nut cover 405 and is configured to prevent rotation of the nut cover 405 when the fastener 410 is secured to the mounting hole 330.

In practice, when the rotational control mechanism 115 is mounted to the second dropout 105, the threaded end 114 of the axle 113 of the quick release mechanism 110 can be threaded into the first portion 415 of the nut 400 by turning the quick release handle 111 attached to the axle 113. As known to those of skill in the art, the quick release handle 111 can be placed into a locked position in which the quick release handle 111 is unable to turn freely and an unlocked position in which the quick release handle 111 is able to turn. Threading and unthreading of the axle 113 is performed when the quick release handle 111 is in the unlocked position such that the quick release handle 111 can turn freely. The locked position is achieved by pivoting (or flipping) the quick release handle 111 approximately 180 degrees from the unlocked position. The quick release handle 111 pivots along the pivot pin 116 depicted in FIG. 1B to alternate from the locked position to the unlocked position, and vice versa.

When the threading of the axle 113 into the first portion 415 of the nut 400 commences, the nut 400 may initially rotate freely or with little resistance within the nut cover 405. From the perspective of FIG. 4 and assuming that the system is not reverse threaded, the nut 400 will rotate in a counter clockwise direction when the quick release handle 111 is turned in a tightening (i.e., clockwise) direction. However, this initial rotation will stop when the nut stop 430 on the second portion 420 of the nut 400 comes into contact with the cover stop 445 on the interior of the second portion 440 of the nut cover 405. As a result, the axle 113 can be threaded into the nut 400 to any desired degree of torque, without further rotation of the nut 400 in the direction of tightening.

When the axle 113 is tightened to the appropriate torque, the quick release handle 111, which is in the unlocked position, may end up in any orientation relative to the fork of the bicycle. However, as discussed above, it is desirable for an end of the quick release handle 111 to be positioned upwards or toward a rear of the bicycle when the quick release handle 111 is flipped into the locked position. The configuration of the rotational control mechanism 115 allows a user to position the quick release handle 111 into virtually any desired orientation after the axle 113 is tight. Specifically, once the axle 113 is tight, the quick release handle 111 can be turned in the opposite, loosening direction, which is counterclockwise for normal threads. Turning the quick release handle 111 in the loosening direction will cause the nut stop 430 on the second portion 420 of the nut 400 to disengage from the cover stop 445 on the interior of the second portion 440 of the nut cover 405.

From the perspective of FIG. 4, when the quick release handle 111 is turned in the loosening, counterclockwise direction, the nut will rotate in a clockwise direction and can continue to do so for almost 360 degrees until nut stop 430 engages the opposite side of the cover stop 445. This provides the user with a large amount of flexibility in positioning the quick release handle 111 prior to flipping it into the locked position, and allows for virtually any desired orientation of the quick release handle 111. Additionally, turning the quick release handle 111 in the loosening direction will not cause the axle 113 to unthread from the nut 400 because the nut 400 is able to turn with relatively little resistance within the nut cover 405 as compared to the resistance encountered when loosening a properly torqued axle from the nut 400. To remove the axle 113, the quick release handle 111 is unlocked and turned in the loosening direction until the nut stop 430 engages the cover stop 445, at which point continuing to turn the quick release handle 111 in the loosening direction will unthread the axle 113 from the nut 400. In an alternative embodiment, a bolt which does not include a quick release handle may be used with the rotational control mechanism described herein to secure a bicycle rim to the dropouts.

The actual amount of free rotation of the nut 400 within the nut cover 405 when the axle 113 is mounted is dependent upon the width of the nut stop 430 and the width of the cover stop 445. Larger widths of the nut stop 430 and/or cover stop 445 will result in a lesser degree of free rotation of the nut 400 within the nut cover 405, and smaller widths of the nut stop 430 and/or cover stop 445 will result in a greater degree of free rotation. In an illustrative embodiment, the nut 400 is able to rotate at least 350 degrees within the nut cover 405. In alternative embodiments, a different amount of free rotation may be used, such as 340 degrees, 345 degrees, 355 degrees, etc.

Figure 5:
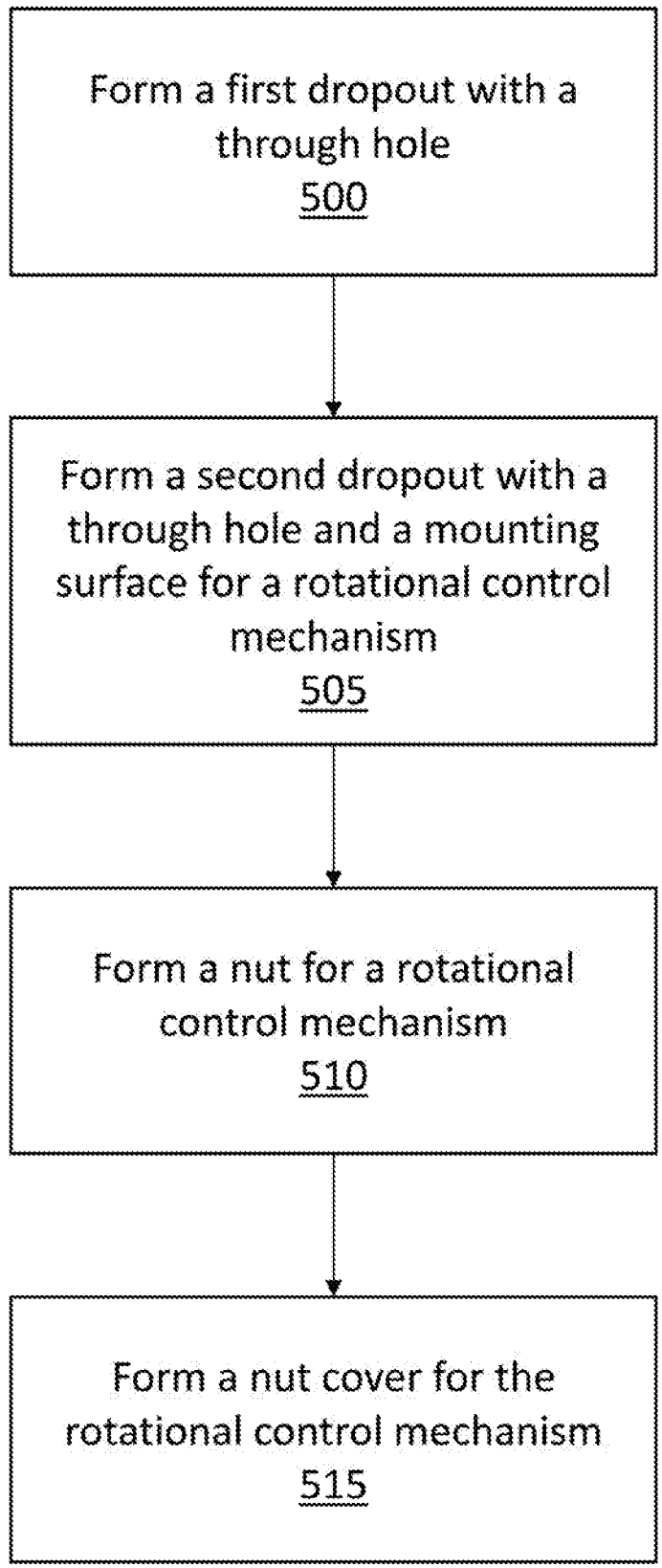
FIG. 5 is a flow diagram depicting operations performed to make a through hole dropout assembly in accordance with an illustrative embodiment.

FIG. 5 is a flow diagram depicting operations performed to make a through hole dropout assembly in accordance with an illustrative embodiment. In alternative embodiments, fewer, additional, and/or different operations may be performed. Additionally, the use of a flow diagram is not meant to be limiting with respect to the order of operations performed. In an operation 500, a first dropout with a through hole is formed. The first dropout can be formed through molding, stamping, cutting, and/or any other techniques known to those of skill in the art. The first dropout can be the first dropout 100 described herein, and can include an indented slot configured to receive a hub of a bicycle rim. Additionally, the through hole of the first dropout is configured to receive an axle shaft. The first dropout also includes a mounting stem such that the first dropout can be mounted to a bicycle fork. Depending on the implementation, the first dropout may also include one or more accessory holes to facilitate the mounting of brakes and/or accessories to the bicycle.

In an operation 505, a second dropout with a through hole and a mounting surface for a rotational control mechanism is formed. The second dropout can be formed through molding, stamping, cutting, and/or any other techniques known to those of skill in the art. In an illustrative embodiment, the second dropout can be the second dropout 105 described herein, and can include an indented slot configured to receive a hub of a bicycle rim. The mounting surface can be an indented surface that is configured to receive a nut cover such as the nut cover 405 described herein. The mounting surface can also include a mounting hole to receive a fastener for mounting the nut cover to the second dropout. The through hole of the second dropout is configured to receive an axle shaft, which can be part of a quick release mechanism. The second dropout also includes a mounting stem such that it can be mounted to a bicycle fork. Depending on the implementation, the second dropout may also include a mounting bracket and/or one or more accessory holes to facilitate the mounting of brakes and/or accessories to the bicycle.

In an operation 510, a nut for a rotational control mechanism is formed. The nut can be formed through molding, stamping, cutting, etc. The nut, which can be the nut 400 described herein, can have a first portion with a first diameter and a second portion with a second diameter, where the first diameter is larger than the second diameter. The first portion can include internal threads configured to mate with a threaded portion of an axle shaft. The first portion of the nut can also include a serrated edge that is designed to contact the mounting surface of the second dropout. The second portion of the nut includes a nut stop such as the nut stop 430 described herein.

In an operation 515, a nut cover for the rotational control mechanism is formed. The nut cover can be formed through molding, stamping, cutting, etc. The nut cover, which can be the nut cover 405 described above, can include a first portion that is configured to cover the first portion of the nut. The first portion of the nut cover can also include a mounting extension with a hole therein that aligns with the mounting hole on the mounting surface of the second dropout. The nut cover can also include a second portion that includes a cover stop such as the cover stop 445 described herein.

Various embodiments of a dropout assembly for a bicycle have been described herein. In alternative embodiments, different configurations and/or components may be used. For example, in on embodiment, the first and second dropouts may be substantially identical to one another, except that one dropout is designed for a right side of the bicycle fork and the other dropout is designed for a left side of the bicycle fork. Additionally, the figures and description herein are with reference to a dropout assembly for a front wheel of a bicycle. In an alternative embodiment, the dropout assembly may also be used to secure a rear wheel of the bicycle.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A dropout assembly comprising:
a first dropout that includes a first through hole configured to receive an axle for a bicycle wheel;
a second dropout that includes a second through hole and a mounting surface, wherein the second through hole is configured to receive the axle for the bicycle wheel; and
a rotational control mechanism configured to mount to the mounting surface of the second dropout, wherein the rotational control mechanism includes a nut and a nut cover;
wherein the nut has a first portion and a second portion, and wherein the second portion of the nut has a nut stop in the form of a protrusion that extends longitudinally along an external surface of the second portion of the nut; and
wherein the nut cover has a first portion and a second portion, wherein the first portion of the nut cover includes a first opening that is sized to fit the first portion of the nut, wherein the second portion of the nut cover includes a second opening that aligns with the first opening and a cover stop in the form of a protrusion that extends longitudinally along an interior surface of the second opening, wherein the nut stop contacts a first side of the protrusion that forms the cover stop to prevent rotation of the nut in a clockwise direction, and wherein the nut stop contacts a second side of the protrusion that forms the cover stop to prevent rotation of the nut in a counterclockwise direction.

2. The dropout assembly of claim 1, further comprising a mounting hole on the mounting surface of the second dropout, wherein the mounting hole is configured to receive a fastener that secures the rotational control mechanism to the second dropout.

3. The dropout assembly of claim 1, wherein the mounting surface comprises an indentation in the second dropout that is configured to receive the nut cover of the rotational control mechanism.

4. The dropout assembly of claim 1, wherein the first portion of the nut has a first diameter and the second portion of the nut has a second diameter, and wherein the first diameter is larger than the second diameter.

5. The dropout assembly of claim 1, wherein the first portion of the nut has a serrated edge that is configured to rest upon the mounting surface of the second dropout.

6. The dropout assembly of claim 1, wherein the first dropout has a first indented slot that includes the first through hole and the second dropout has a second indented slot that includes the second through hole, and wherein the first indented slot and the second indented slot are configured to receive hubs of a rim.

7. The dropout assembly of claim 6, wherein the first indented slot and the second indented slot are configured such that the first through hole, the second through hole, and a through hole between the hubs of the rim are aligned when the hubs of the rim are inserted into the first indented slot and the second indented slot.

8. The dropout assembly of claim 1, wherein the first portion of the nut cover includes an extension with an opening, wherein the opening is configured to receive a fastener that secures the rotational control mechanism to the mounting surface.

9. The dropout assembly of claim 1, wherein the cover stop allows the nut to rotate at least 350 degrees within the nut cover.

10. The dropout assembly of claim 1, further comprising a quick release mechanism that includes a quick release handle and the axle, wherein the quick release handle is configured to rotate the axle, and wherein the axle has a threaded end.

11. The dropout assembly of claim 10, wherein the nut includes a threaded opening that is configured to receive the threaded end of the axle.

12. The dropout assembly of claim 1, wherein rotation of the nut within the nut cover when the axle is mounted to the nut allows the quick release handle to be positioned in a desired orientation.

\* \* \* \* \*